US010497060B2

(12) United States Patent
Khatami

(10) Patent No.: US 10,497,060 B2
(45) Date of Patent: Dec. 3, 2019

(54) SYSTEMS AND METHODS FOR INTELLIGENT MARKET TRADING

(71) Applicant: Seyedhooman Khatami, Tbilisi (GE)

(72) Inventor: Seyedhooman Khatami, Tbilisi (GE)

( * ) Notice: Subject to any disclaimer, the term of this patent is extended or adjusted under 35 U.S.C. 154(b) by 532 days.

(21) Appl. No.: 15/334,254

(22) Filed: Oct. 25, 2016

(65) Prior Publication Data

US 2018/0114267 A1 Apr. 26, 2018

(51) Int. Cl.
*G06Q 40/04* (2012.01)
*G06N 3/04* (2006.01)
*G06N 3/08* (2006.01)

(52) U.S. Cl.
CPC ............ *G06Q 40/04* (2013.01); *G06N 3/0436* (2013.01); *G06N 3/08* (2013.01)

(58) Field of Classification Search
CPC ........ G06Q 10/00; G06Q 20/00; G06Q 30/00; G06Q 40/00
USPC ......................................................... 705/3–44
See application file for complete search history.

(56) References Cited

U.S. PATENT DOCUMENTS

| | | | | | |
|---|---|---|---|---|---|
| 7,636,685 | B1 * | 12/2009 | Ebert | ...................... | G06Q 40/00 705/35 |
| 8,145,558 | B2 * | 3/2012 | Duquette | ................ | G06Q 40/06 705/35 |
| 8,150,761 | B2 * | 4/2012 | Duquette | ................ | G06Q 40/06 705/35 |
| 8,346,646 | B2 * | 1/2013 | Cutler | .................... | G06F 3/0481 705/36 R |
| 8,433,645 | B1 * | 4/2013 | Waelbroeck | ............ | G06Q 40/04 705/37 |
| 8,606,685 | B2 * | 12/2013 | Keiser | ................... | G06Q 10/063 705/37 |
| 8,744,945 | B2 * | 6/2014 | Lane | ....................... | G06Q 30/06 705/36 R |

(Continued)

OTHER PUBLICATIONS

Rodriguez-Gonzalez et al. "CAST: Using neural networks to improve trading systems based on technical analysis by means of the RSI financial indicator", Computer Science Department, Universidad Carbs III de Madrid, Av. Universidad 30, Leganes, 28911 Madrid, Spain. (Year: 2011).*

*Primary Examiner* — Frantzy Poinvil

(57) ABSTRACT

A system for intelligent market trading implemented with a neural network system (Machine Learning) comprising an input, one or more processors and an output. The input comprises a database of price of a symbol and a pair in a timeframe. The first processor is configured to receive the respective input to generate a technical analysis, a trading signal, and a market report with a probability value. The second processor generates a coefficient for regulating the probability value of the generated trading signals and technical analysis using fuzzy logic systems alongside of a neural network system. The third processor computes the correlation coefficient of symbols under Mesh topology and regulates the resultant probability value of each trading signals and technical analysis. The output comprises a processor to receive and evaluate the individual resultant probability values of the generated trading signals and technical analysis and delivers an output data. The output data is sent via notification to a user for detecting a suitable spot for placing their orders in the financial market.

20 Claims, 8 Drawing Sheets

(56) References Cited

U.S. PATENT DOCUMENTS

| | | | | |
|---|---|---|---|---|
| 8,781,947 B2* | 7/2014 | Duquette | ............... | G06Q 40/06 |
| | | | | 705/35 |
| 2005/0267836 A1* | 12/2005 | Crosthwaite | ........... | G06Q 40/00 |
| | | | | 705/37 |
| 2012/0209756 A1* | 8/2012 | El-Sakkout | ............ | G06Q 40/04 |
| | | | | 705/37 |
| 2013/0124382 A1* | 5/2013 | Cutler | ................... | G06F 3/0481 |
| | | | | 705/37 |
| 2014/0379552 A1* | 12/2014 | Duquette | ............... | G06Q 40/04 |
| | | | | 705/37 |
| 2017/0039642 A1* | 2/2017 | Brookfield | ............. | G06Q 40/04 |
| 2017/0316504 A1* | 11/2017 | Lane | ...................... | G06Q 30/06 |

* cited by examiner

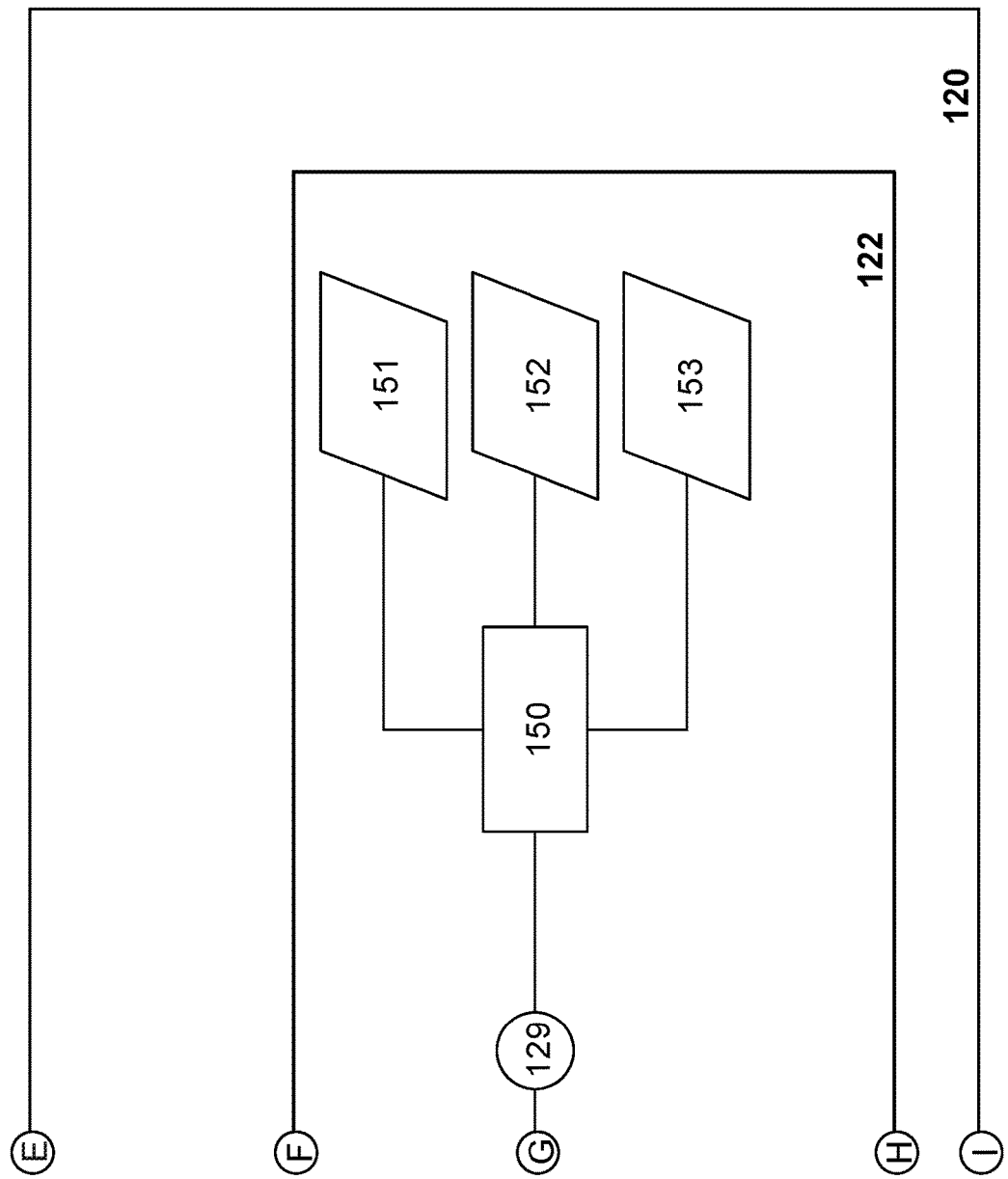

SYSTEMS AND METHODS FOR INTELLIGENT MARKET TRADING

BACKGROUND OF THE INVENTION

Market risk is the possibility for a trader to experience losses due to factors that affect the overall performance of the financial markets in which he is involved. Most of the traders may have insufficient time to monitor the financial market price chart to detect a suitable spot for placing their orders. Even with sufficient time, other traders could not monitor a desired symbol and pair within the set of symbol and pair in the price chart. Most of the traders find it difficult to calculate the effect of each symbol and pair on other symbols and pairs. The trader requires years of profound experience and financial knowledge to place the orders on distinguishing technical analysis patterns and applying a valid strategy on desired symbol and pair by combining multiple strong indicators and other trading tools.

The technical analysis and trading signals are generated based on strategies, which must be developed by accurate and effective indicators and trading patterns in a system. The technical analysis and trading signals were developed in the existing system based on the highest strategies that could lose their success rate as time passed due to their static and fixed structure. Further, these existing technical analysis and trading signals are generated on very limited number of patterns and indicators with static strategies.

An experienced trader also detects the suitable spot for placing the orders based on the analysis of multiple financial experts and current trends through news and economic conditions. Prior art systems are unequipped with suitable means for utilizing fundamental analysis from the financial experts, which could be implemented on the generated trading signals and technical analysis.

The unexpected results from the economic or breaking news is unaccounted on real-time basis in the conventional systems. News and economic conditions were also never utilized and implemented on the generated trading signals and technical analysis in the conventional systems. Further, the conventional systems could not evaluate the correlation between symbols and pairs, and calculate the effects of symbols and pairs on each other. Therefore, there is a need in an art for a system and method for detecting most prosperous trading patterns, and develops multiple strategies by applying powerful indicators and trading patterns with high success rate.

SUMMARY OF THE INVENTION

The present invention relates to a computer-implemented system and method for intelligent market trading implemented with a neural network. The computer-implemented system having processor-executable instructions stored thereon that, when executed by at least one processor, the computer-implemented system comprises an input comprising a database of price of a symbol and a pair in a timeframe, wherein the input is configured to provide a dynamic specification and a predetermined market behavior of each symbol and pair in all individual timeframe. In an embodiment, the computer-implemented system includes a chart processor, which is implemented with the neural network having plurality of layers, and each layer is configured to receive the respective input generating a technical analysis, a trading signal, and a market report.

One aspect of the present disclosure is directed to a computer-implemented system for intelligent market trading implemented with a neural network, the computer-implemented system having processor-executable instructions stored thereon that, when executed by at least one processor, the computer-implemented system comprising: (a) an input comprising a database of price of a symbol, and a pair in a timeframe, wherein the input is configured to provide a dynamic specification, and to provide a predetermined behavior of each symbol and pair in a plurality of individual timeframes; (b) a chart processor implemented with the neural network, the chart processor comprising a plurality of layers, each layer is configured to receive the respective input to generate a technical analysis, a trading signal, and a market report, the chart processor comprising: (b1) a strategy generator processor configured to receive the input to generate multiple strategies using a trading indicator with a predefined success rating in a dynamic structure inputted from the database, wherein the strategy generator processor connects the trading indicator in a plurality combinations of the symbol and the pair to generate one or more strategies using a mesh network; (b2) a technical analysis and trading signal processor comprising the layers, each layer configured to receive one or more generated strategies, wherein the technical analysis and trading signal processor comprises: (b2i) a strategy layer configured to receive one or more generated strategies, wherein each strategy is regulated with the predefined success rating inputted from the database; (b2ii) a timeframe layer configured to receive one or more regulated strategies from the strategy layer, and is configured to calculate and control the correlation between different timeframes of each symbol generating a probability value of the trading signal, wherein the timeframes on each symbol is regulated with the predefined success rating inputted from the database; (b2iii) a symbol layer configured to receive one or more generated probability values of the trading signal from the timeframe layer, and is configured to calculate an effect of the generated technical signal on different symbols and pairs in a specific timeframe, wherein the trading signal on the symbols and pairs in the specific timeframe is regulated with the predefined success rating inputted from the database; (b2iv) an output layer configured to receive the input from the layers to generate the trading signals, technical analysis and market report with the generated probability value of the symbol and the pair in the specific timeframe; a fundamental processor is configured to receive the generated trading signals and the technical analysis from the output layer of the chart processor, wherein the generated trading signals and the technical analysis is coupled to a fundamental analysis layer and a news layer using a fuzzy logic to generate a coefficient for regulating the probability value of the generated trading signals and the technical analysis; a correlation coefficient processor coupled with the mesh network to receive all the trading signals and the technical analysis of the symbols and the pairs in the timeframes, the correlation coefficient processor is configured to calculate the correlation coefficient between the symbols and the pairs generating a resultant probability value of each trading signal and the technical analysis; and an output generator module comprising a output processor configured to receive and evaluate the individual resultant probability value of the generated trading signals and the technical analysis to provide one or more output data, wherein the computer-implemented system delivers the output data via a notification to a user.

In one embodiment of the computer-implemented system, each trading pattern is a node for the mesh network. In another embodiment, the market report is generated by using a report builder in the output layer of the chart processor. In one embodiment, the news layer receives one or more news from the database as an input using the fuzzy logic systems. In one embodiment, the fundamental analysis layer receives an analysis from one or more financial market analyzers from the database as an input using the fuzzy logic systems. In another embodiment, the output data of the processors are uploaded to an adaptive database of the neural network. In a related embodiment, the output data of the processors are regulated real-time by the adaptive database, wherein comparing the success rating of each output to one or more previous output in the adaptive database.

In one embodiment, the output data includes a resultant trading signals and resultant technical analysis with the resultant probability value, a resultant market report, and a resultant risk and money management. In another embodiment, the output data is delivered to the user via a visual notification, an audio notification or a tactile notification.

In one embodiment, the chart processor comprises a strategy generator processor configured to receive the input to generate a strategy using a trading indicator and pattern with highest or predefined success rating in a dynamic structure inputted from the database. The strategy generator processor is configured to connect the trading indicator and pattern in all combinations to generate one or more strategies using a mesh network. In an embodiment, the chart processor in the system further comprises a technical analysis and trading signal processor having plurality of layers, and each layer is configured to receive one or more generated strategies.

In one embodiment, the technical analysis and trading signal processor includes a strategy layer configured to receive one or more generated strategies, wherein each strategy is regulated with individual success rating inputted from the database. In an embodiment, the technical analysis and trading signal processor includes a timeframe layer configured to receive one or more regulated strategy from the strategy layer. In one embodiment, the timeframe layer is configured to calculate and control the correlation between different timeframes on each symbol generating a probability value of the technical signal, wherein the timeframes on each symbol is regulated with individual success rating inputted from the database.

In one embodiment, the technical analysis and trading signal processor further includes a symbol layer configured to receive one or more generated probability value of the technical signal from the timeframe layer. In another embodiment, the symbol layer is configured to calculate an effect of the generated technical signal on different symbols and pairs in a specific timeframe. In one embodiment, the technical signal on the symbols and pairs in specific timeframe is regulated with individual success rating inputted from the database. In one embodiment, the technical analysis and trading signal processor in the system further comprises an output layer configured to receive input from the said layers and generate the trading signals, technical analysis and market report with individual probability value of the symbol and pair in a specific timeframe. In one embodiment, the market report is generated by using a report builder in the output layer of the chart processor.

In an embodiment, the system further includes a fundamental processor configured to receive the generated trading signals and technical analysis from the output layer of the chart processor. In one embodiment, the fundamental processor is coupled to a fundamental analysis layer and news layer using a fuzzy logic systems to generate a coefficient for regulating the probability value of the generated trading signals and technical analysis. In one embodiment, the news layer receives one or more news from the database as an input using the fuzzy logic systems. In one embodiment, the fundamental analysis layer receives an analysis from one or more financial market analyzers from the database as an input using the fuzzy logic systems. In one embodiment, the term fuzzy logic systems is used because there are two different fuzzy logic systems that are implemented—one of them is designed to regulate the effect of the financial news while the other one is utilized to regulated the probability value based on the market forecast from a professional market analyst.

In an embodiment, the system further includes a correlation coefficient processor, which is coupled with the mesh network to receive all the trading signals and technical analysis of the symbols and pairs in all timeframes. In one embodiment, the correlation coefficient processor is configured to calculate the correlation coefficient between the said symbols and pairs generating a resultant probability value of each trading signals and technical analysis. In an embodiment, the system further includes an output generator module comprising a processor configured to receive and evaluate the individual resultant probability values of all generated trading signals and technical analysis to provide one or more output data. In one embodiment, the system delivers the said output data via a notification to a user. In another embodiment, the output data is delivered to the user via a visual notification, an audio notification or a tactile notification.

In an embodiment, each trading pattern or indicator is a node for the mesh network. In one embodiment, the output data includes a resultant trading signals and resultant technical analysis with the resultant probability value, a resultant market report, and a resultant risk and money management. In one embodiment, the output data of the said processors are uploaded to an adaptive database of the neural network. In another embodiment, the output data of the said processors is regulated real-time by the adaptive database by comparing the success rating of each output to one or more previous output in the adaptive database.

In an embodiment, a computer-readable storage medium having processor-executable instructions stored thereon that, when executed by one or more processors cause the processors to input financial market price chart of a symbol and a pair in all timeframes from a database into the first processor. In one embodiment, the computer-readable storage medium generates a technical analysis, a trading signal, and a market report with a probability value by one or more layers of the first processor using one or more strategies. In one embodiment, the strategies are generated a strategy in a layer using a trading indicator and pattern with highest or predefined success rating in a dynamic structure inputted from the database.

In an embodiment, the generated output comprising technical analysis, trading signals, and market report of the first processor are inputted into the second processor and generate a coefficient. In one embodiment, the generated coefficient is used for regulating the probability value of the generated trading signals and technical analysis by one or more layers of the second processor using the fuzzy logic systems. In an embodiment, the generated trading signals and technical analysis of the symbols and pairs in all timeframes are inputted into the third processor. In one embodiment, the third processor is implemented with a mesh network to compare and calculate the correlation coefficient between the said symbols and pairs. In one embodiment, a computer-readable storage medium having processor-executable instructions stored thereon that, when executed by one or more processors cause the processors to generate a resultant probability value of each trading signals and technical analysis as an output data, and deliver the output data via a notification to a user.

Another aspect of the present disclosure is directed to a computer-readable storage medium having processor-executable instructions stored thereon that, when executed by one or more processors cause the processors to: (a) input one or more financial market price chart of a symbol and a pair in all timeframes from a database into the first processor; (b) generate a technical analysis, a trading signal, and a market report with a probability value by one or more layers of the first processor, wherein generating a strategy in a layer using a trading indicator and pattern with predefined success rating in a dynamic structure inputted from the database; (c) input the generated technical analysis, trading signals, and market report into the second processor; (d) generate a coefficient for regulating the probability value of the generated trading signals and technical analysis by one or more layers of the second processor using a fuzzy logic; (e) input the generated trading signals and technical analysis of the symbols and pairs in all timeframes into the third processor; (f) compare and calculating a correlation coefficient between the symbols and pairs by the third processor; (g) generate a resultant probability value of each trading signals and technical analysis as an output data; and (h) deliver the output data via a notification to a user. In one embodiment, the term fuzzy logic may be used to mean fuzzy logic systems.

In one embodiment, the generated coefficient is compared with the coefficient based on the one or more layers of the second processor using fuzzy logic systems to regulate the probability value of the trading signal and technical analysis. In another embodiment, the generated output of the said processors are uploaded to an adaptive database of the neural network. In another embodiment, the generated output of the said processors is regulated real-time by the adaptive database, wherein comparing each output to one or more previous outputs in the adaptive database.

One aspect of the present disclosure is directed to an intelligent market trading method implemented with a neural network, the computer-implemented system having processor-executable instructions stored thereon that, when executed by at least one processor, the method comprising: (a) providing a neural network system comprising a first processor, a second processor and a third processor; (b) inputting one or more financial market price chart of a symbol and a pair in all timeframes from a database into the first processor; (b) generating a technical analysis, a trading signal, and a market report with a probability value by one or more layers of the first processor, wherein generating a strategy in a layer using a trading indicator and pattern with predefined success rating in a dynamic structure inputted from the database; (c) inputting the generated technical analysis, trading signals, and market report into the second processor; (d) generating a coefficient for regulating the probability value of the generated trading signals and technical analysis by one or more layers of the second processor using a fuzzy logic; (e) inputting the generated trading signals and technical analysis of the symbols and pairs in all timeframes into the third processor; (f) comparing and calculating correlation coefficient between the said symbols and pairs by the third processor; (g) generating a resultant probability value of each trading signals and technical analysis as an output data; and (h) delivering the output data via a notification to a user.

In an embodiment, a method intelligent market trading implemented with a neural network, the computer-implemented system having processor-executable instructions stored thereon that, when executed by at least one processor is disclosed. In one embodiment, the method comprises a step of providing a neural network system include one or more processors. Another step of the method include inputting one or more financial market price chart of a symbol and a pair in all timeframes from a database into the first processor. In one embodiment, the method according to the invention generates a technical analysis, a trading signal, and a market report with a probability value by one or more layers of the first processor using one or more strategies. In one embodiment, the strategies are generated a strategy in a layer using a trading indicator and pattern with highest or predefined success rating in a dynamic structure inputted from the database.

In an embodiment, the generated output comprising technical analysis, trading signals, and market report of the first processor are inputted into the second processor and generate a coefficient. In one embodiment, the generated coefficient is used for regulating the probability value of the generated trading signals and technical analysis by one or more layers of the second processor using the fuzzy logic systems. In an embodiment, the generated trading signals and technical analysis of the symbols and pairs in all timeframes are inputted into the third processor. In one embodiment, the third processor is implemented with a mesh network to compare and calculate the correlation coefficient between the said symbols and pairs. In one embodiment, the final step of the method generates a resultant probability value of each trading signals and technical analysis as an output data, and deliver a notification of the said output data to a user.

In an embodiment, the first processor is a chart processor, the second processor is a fundamental analysis and news processor, and the third processor is a correlation coefficient processor. In an embodiment, the generated coefficient is compared with the coefficient based on the one or more layers of the second processor using fuzzy logic systems to regulate the probability value of the trading signal and technical analysis. In one embodiment, the generated output of the said processors are uploaded to an adaptive database of the neural network. In another embodiment, the generated output of the said processors is regulated real-time by the adaptive database and compare each output to one or more previous output in the adaptive database.

In one embodiment, the first processor is a chart processor. In another embodiment, the second processor is a fundamental analysis and news processor. In one embodiment, the third processor is a correlation coefficient processor. In one embodiment, the generated coefficient is compared with the coefficient based on the one or more layers of the second processor using fuzzy logic systems to regulate the probability value of the trading signal and technical analysis. In one embodiment, the output data of the processors are uploaded to an adaptive database of the neural network. In one embodiment, the output data of the processors are regulated real-time by the adaptive database, wherein comparing each output to one or more previous outputs in the adaptive database.

Other objects, features and advantages of the present invention will become apparent from the following detailed description. It should be understood, however, that the detailed description and the specific examples, while indicating specific embodiments of the invention, are given by way of illustration only, since various changes and modifications within the spirit and scope of the invention will become apparent to those skilled in the art from this detailed description.

BRIEF DESCRIPTION OF DRAWINGS

FIG. 2A-2B illustrates a block diagram of a chart processor in the system.

DETAILED DESCRIPTION

The present invention generally relates to market trading tool, and more particularly relates to a system and method for intelligent market trading implemented using a neural network technology.

A description of embodiments of the present invention will now be given with reference to the Figures. It is expected that the present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes that come within the meaning and range of equivalency of the claims are to be embraced within their scope.

Figure 1A:
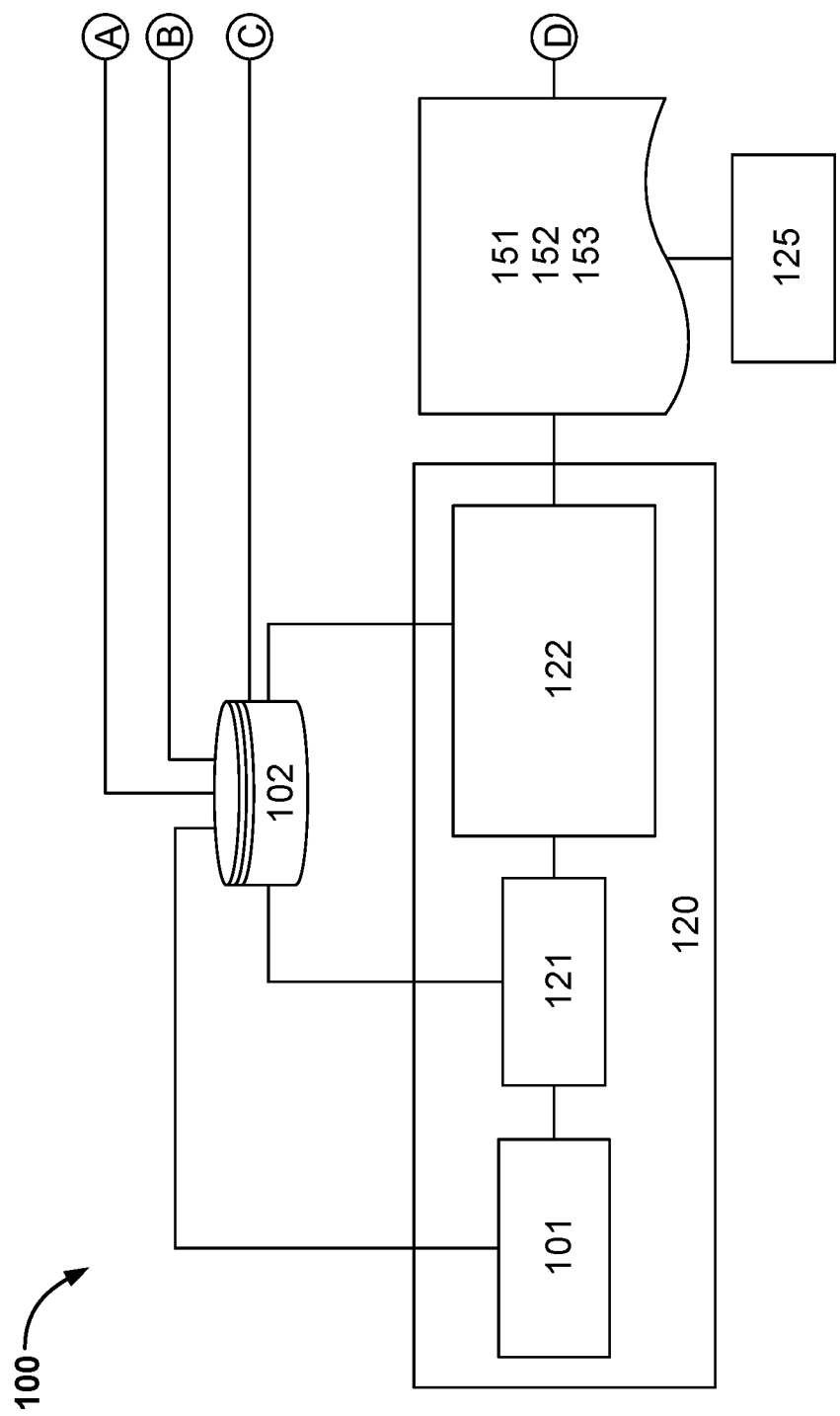
FIG. 1A-1B illustrates a block diagram of a system for intelligent market trading.
Figure 1B:
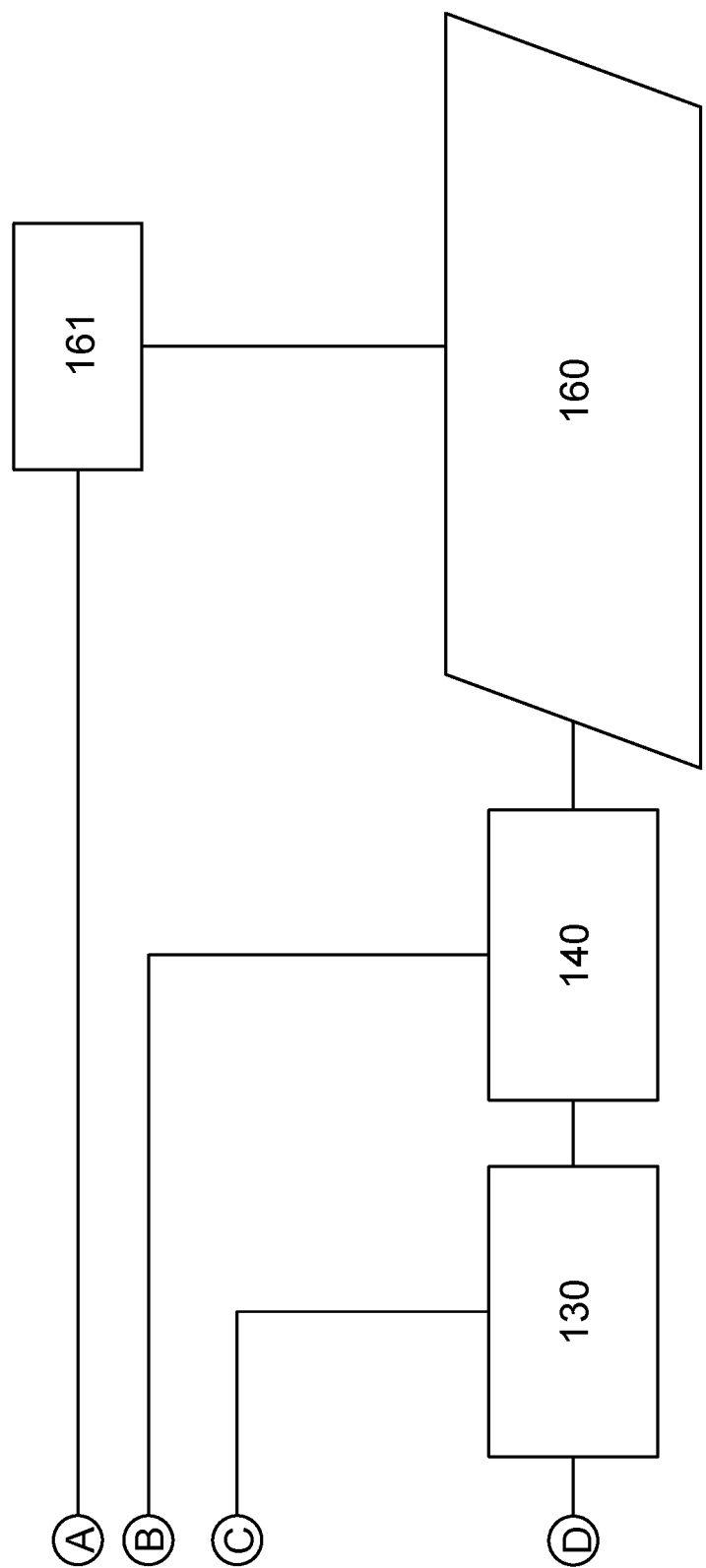

The present invention relates to a system and method for intelligent market trading implemented with a neural network. Referring to FIG. 1A-1B, which illustrates a block diagram of the system 100 implemented with a neural network for intelligent trading in a financial market. In an embodiment, the system 100 according to the invention comprises an input 101 comprising a database 102 with a financial market data on multiple price charts of a tradable symbol and a tradable pair in a timeframe. In one embodiment, the input 101 is configured to provide a dynamic specification and a predetermined market behavior of each symbol and pair in all individual timeframe.

In an embodiment, the system 100 according to the present invention is implemented with the neural network providing one or more interconnected processors and one or more layers for intelligent trading in a financial market. In an embodiment, the system 100 comprises a chart processor 120, a fundamental processor 130 and a coefficient correlation processor 140. In one embodiment, the chart processor 120 is implemented with the neural network having plurality of layers, and each layer is configured to receive the respective input data generating a technical analysis 151, a trading signal 152, and a market report 153. In one embodiment, the market report 123 is generated by using a report builder 125 of the chart processor 120. In an embodiment, the system 100 further includes a fundamental processor 130 configured to receive the generated technical analysis 151 and trading signals 152 from the chart processor 120 and output the regulated trading signals and technical analysis with a probability value or a success rating.

In one embodiment, the coefficient correlation processor 140 is configured to receive the generated output of the fundamental processor 130, and compare and correlate all possible relationship of the symbols and pair for the specific timeframe. Further, the fundamental processor 130 analysis an impact or effect of all the symbols and pairs on the technical analysis and trading signals to provide the accurate technical analysis and trading signals. In an embodiment, the system 100 further includes an output generator module 160 comprising a processor 161 configured to receive and evaluate the individual resultant probability values of all generated trading signals and technical analysis to provide an output data. In an embodiment, the final output data of the system 100 are technical analysis and trading signals with a probability value, market report, and risk and money management.

Figure 2A:
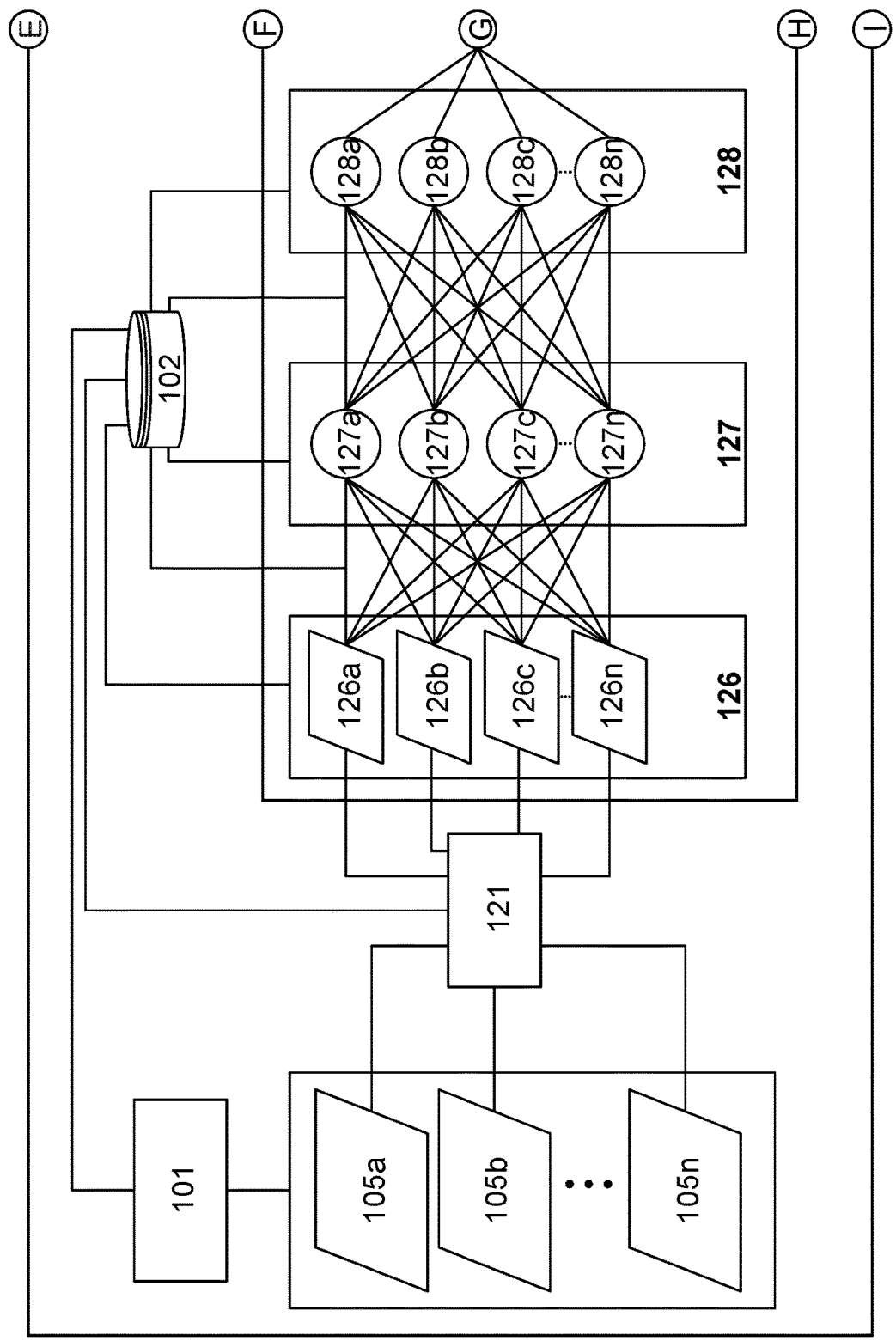

Referring to FIG. 2A-2B, which illustrates a block diagram of the chart processor 120 in the system 100, implemented with the neural network to generate technical analysis and trading signal based on dynamic structure, wherein the system 100 enhance and improve the performance over a non-linear data. In one embodiment, the tradable symbol and pair in the timeframe from the database 102 are inputted into the chart processor 120. In an embodiment, the chart processor 120 comprises a strategy generator processor 121 configured to receive the input data to generate a strategy 121a using a trading indicator and pattern with highest or predefined success rating in a dynamic structure inputted from the database 102. In one embodiment, the database 102 is an adaptive database.

In an embodiment, the strategy generator processor 121 is configured to connect the trading indicator and pattern in all combinations of multiple symbols 105a, 105b, . . . , 105n to generate one or more strategies 126a, 126b, . . . , 126n using a mesh network. In one embodiment, the mesh networking topology enables the system 100 to connect all the trading patterns and indicators and each trading patterns and indicators are considered as a node in the mesh networking topology. In one embodiment, the strategies 126a, 126b, . . . , 126n are produced from any combination of the patterns and indicators. For example, one strategy may be generated from the combination of three patterns and two indicators, which specifies an acceptable technical analysis or trading signal with same entry and exit prices. In one embodiment, the strategy generator processor 121 generates a trading strategy data, and output the strategies 126a, 126b, . . . , 126n into an input strategic layer of the forthcoming processor.

In an embodiment, the chart processor in the system 100 further comprises a technical analysis and trading signal processor 122 having plurality of layers, and each layer is configured to receive one or more generated strategies 126a, 126b, . . . , 126n. In one embodiment, the technical analysis and trading signal processor 122 includes a strategy layer 126 configured to receive one or more generated strategies 126a, 126b, . . . , 126n, wherein each strategy is regulated with individual success rating inputted from the database 102. In one embodiment, all trading pattern and indicators are provided with individual success rate and the success rate is regulated by neural network system 100 from the prosperity of the previous outcomes on certain symbol and pair in each timeframe fed from the database 102. In one embodiment, the latest outcomes are considered as the most influence on the success rate values. In one embodiment, the generated strategy 126a, 126b, . . . , 126n, is provided with aggregated success rates with proprietary algorithm that enforces the used indicators and trading patterns. In one embodiment, each technical analysis or trading signal on the specific symbol in a timeframe has effect on other technical analysis or trading signal of that symbol in other timeframes.

In an embodiment, the technical analysis and trading signal processor 122 includes a timeframe layer 127 configured to receive one or more regulated strategies 126a, 126b, ..., 126n, received from the strategy layer 125. In one embodiment, the timeframe layer is configured to calculate and control the correlation between different timeframes 127a, 127b, ..., 127n on each symbol generating a probability value of the technical signal, wherein the timeframes 127a, 127b, ..., 127n on each symbol is regulated with individual success rating inputted from the database. In one embodiment, the success rate or coefficient of each technical analysis or trading signal is changed or regulated by the correlation on different variables such as a current economic conditions, news, and financial expert analysis in the forthcoming layers of the system 100. In one embodiment, the credibility, reliability and validity of each technical analysis or trading signal is regulated by the amount of probability value.

In one embodiment, the technical analysis and trading signal processor 122 further includes a symbol layer 128 configured to receive one or more generated probability value of the technical signal from the timeframe layer 127. In another embodiment, the symbol layer 128 is configured to compare and calculate an effect of the generated technical signal on different symbols 128a, 128b, ..., 128n and pairs in a specific timeframe 127a, 127b, ..., 127n. In one embodiment, the technical signal on the symbols and pairs in specific timeframe is regulated with individual success rating inputted from the database 102. In one embodiment, the correlation of the success rating of the trading signals and technical analysis is controlled, and considered in this layer on each generated trading signals and technical analysis of specific symbol or pair on certain timeframe. In an embodiment, the success rating or weightage is regulated by the system 100 implemented with neural network is updated and fed from the database 102. In one embodiment, the database 102 is an adaptive database. In another embodiment, the historical or past successful trading signals and technical analysis are streamed and fed into the database 102 are provided to the neural network system 100.

In one embodiment, the technical analysis and trading signal processor 122 in the system 100 further comprises an output layer 129 configured to receive input data from the above said layers and generate the trading signals 151, technical analysis 152 and market report 153 with individual probability value of the symbol and pair in a specific timeframe. In one embodiment, the input data from the above said layers are received by using an extractor 150 in the system 100.

One aspect of the present disclosure is directed to a computer-implemented system for intelligent market trading implemented with a neural network, the computer-implemented system having processor-executable instructions stored thereon that, when executed by at least one processor, the computer-implemented system comprising: (a) an input comprising a database of price of a symbol, and a pair in a timeframe, wherein the input is configured to provide a dynamic specification, and to provide a predetermined behavior of each symbol and pair in a plurality of individual timeframes; (b) a chart processor implemented with the neural network, the chart processor comprising a plurality of layers, each layer is configured to receive the respective input to generate a technical analysis, a trading signal, and a market report, the chart processor comprising: (b1) a strategy generator processor configured to receive the input to generate multiple strategies using a trading indicator with a predefined success rating in a dynamic structure inputted from the database, wherein the strategy generator processor connects the trading indicator in a plurality combinations of the symbol and the pair to generate one or more strategies using a mesh network; (b2) a technical analysis and trading signal processor comprising the layers, each layer configured to receive one or more generated strategies, wherein the technical analysis and trading signal processor comprises: (b2i) a strategy layer configured to receive one or more generated strategies, wherein each strategy is regulated with the predefined success rating inputted from the database; (b2ii) a timeframe layer configured to receive one or more regulated strategies from the strategy layer, and is configured to calculate and control the correlation between different timeframes of each symbol generating a probability value of the trading signal, wherein the timeframes on each symbol is regulated with the predefined success rating inputted from the database; (b2iii) a symbol layer configured to receive one or more generated probability values of the trading signal from the timeframe layer, and is configured to calculate an effect of the generated technical signal on different symbols and pairs in a specific timeframe, wherein the trading signal on the symbols and pairs in the specific timeframe is regulated with the predefined success rating inputted from the database; (b2iv) an output layer configured to receive the input from the layers to generate the trading signals, technical analysis and market report with the generated probability value of the symbol and the pair in the specific timeframe; a fundamental processor is configured to receive the generated trading signals and the technical analysis from the output layer of the chart processor, wherein the generated trading signals and the technical analysis is coupled to a fundamental analysis layer and a news layer using fuzzy logic systems to generate a coefficient for regulating the probability value of the generated trading signals and the technical analysis; a correlation coefficient processor coupled with the mesh network to receive all the trading signals and the technical analysis of the symbols and the pairs in the timeframes, the correlation coefficient processor is configured to calculate the correlation coefficient between the symbols and the pairs generating a resultant probability value of each trading signal and the technical analysis; and an output generator module comprising a output processor configured to receive and evaluate the individual resultant probability value of the generated trading signals and the technical analysis to provide one or more output data, wherein the computer-implemented system delivers the output data via a notification to a user.

Figure 3A:
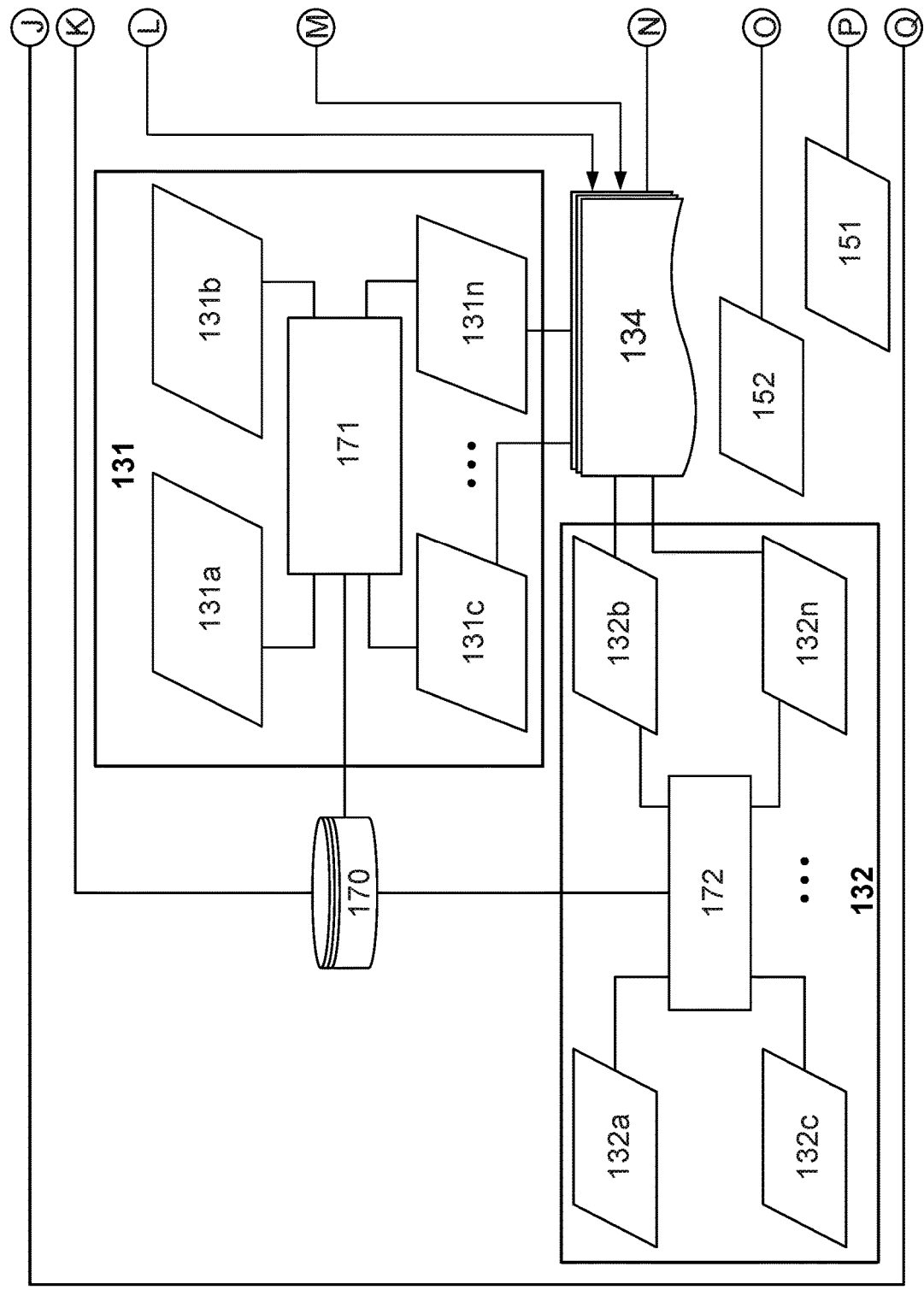
FIG. 3A-3B illustrates a block diagram of a fundamental processor in the system.
Figure 3B:
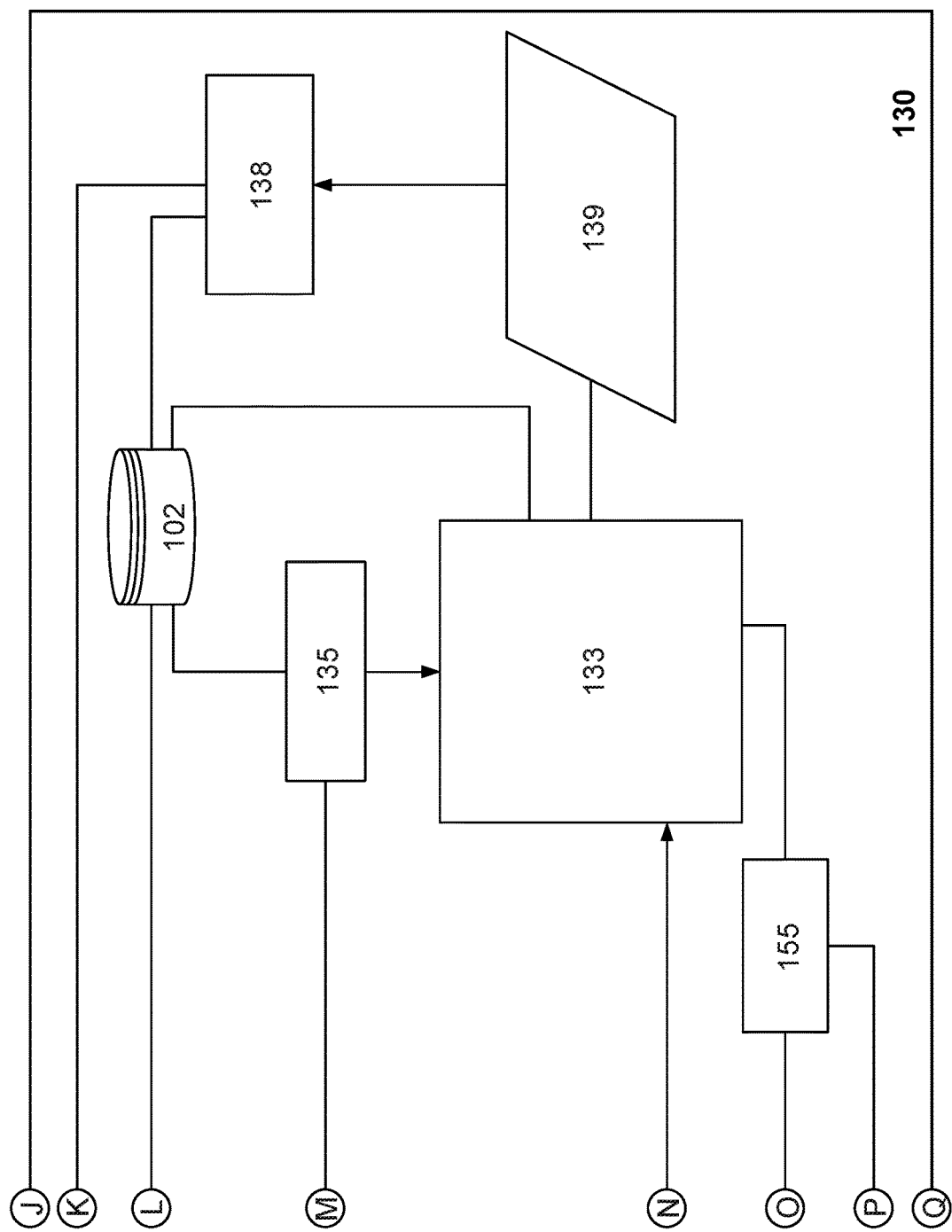

Referring to FIG. 3A-3B, which illustrates a block diagram of the fundamental processor 130 in the system 100. In an embodiment, the system 100 further includes a fundamental processor 130 configured to receive the generated trading signals and technical analysis from the output layer 129 of the chart processor 120. In one embodiment, the fundamental processor 130 is coupled to a fundamental analysis layer 131 and news layer 132 using fuzzy logic systems to generate a coefficient for regulating the probability value of the generated trading signals and technical analysis.

In an embodiment, the trading signals 151 and technical analysis 152 are input as a separated input 155 into a central fuzzy processor 133. In one embodiment, the statistical input data 135 from the database 102 are input into the central fuzzy processor 133. In one embodiment, the fuzzy processor 133 is coupled to a fundamental analysis layer 131 and news layer 132 to generate a coefficient for regulating the probability value of the generated trading signals 151 and technical analysis 152. In one embodiment, the fundamental processor 130 generates regulated trading signals and technical analysis with probability value as an output data 139.

In one embodiment, the output data 139 are fed into the database 102, which are provided to the neural network system 100. In one embodiment, the regulated trading signals and technical analysis with probability value are fed into the adaptive database 102 and a local database 170 via a chart tracking processor 138.

In one embodiment, the fundamental analysis layer 131 receives multiple analysis or opinion 131a, 131b, ..., 131n from multiple financial market experts or analyzers from a local database 170 as an input into the fundamental opinion fuzzy logic processor 171. In one embodiment, the fundamental opinion fuzzy logic processor 171 implements the success rating or coefficient based on the fundamental opinion of multiple financial experts and regulate the trading signal with the probability value. In one embodiment, the input data from each analysis are market direction, the amount of price shift and probability of predicted trend movement. In one embodiment, the generated coefficient from each financial expert is implemented with the success rate of given expert to generate a final coefficient.

In an embodiment, the news layer 132 receives one or more news from the local database 170 as an input into the news fuzzy logic processor 172. In one embodiment, the news fuzzy logic processor 172 implements the success rating or coefficient based on the news effect on the direction and amount of change in the market trend and power, which is used for regulating the trading signal with the probability value. In one embodiment, the produced coefficient is considered with a previous success rate of the specific news to adjust or regulate the probability value after a defuzzification process.

In one embodiment, the output coefficients of the both fundamental opinion fuzzy logic processor 171 and news fuzzy logic processor 172 are provided to the central fuzzy processor 133 via a fuzzy builder 134 to regulate and adjust the probability value of the technical signal and technical analysis. The credibility and validity of the trading signal is fine-tuned after coupling the fundamental analysis processor 130 with the technical analysis processor 122.

In an embodiment, the system 100 according to the present invention further includes a correlation coefficient processor 140 as shown in FIG. 1A-1B. In one embodiment, the correlation coefficient processor 140 s coupled with the mesh network to receive all the trading signals and technical analysis of the symbols and pairs in all timeframes. In one embodiment, the correlation coefficient processor 140 is configured to compare and calculate the correlation coefficient between the said symbols and pairs generating a resultant probability value of each trading signals and technical analysis. For instance, there is a strong correlation between EUR/USD and GBP/USD, so any valid and reliable trading signals and technical analysis on one of them will influence other trading signals and technical analysis from the other pair. In one embodiment, the correlation coefficient is adjusted real-time by the database 102, considering the success rates of each one and the previous results in the database. In another embodiment, the correlation coefficient is implemented by a mathematical equation and algorithm to enhance the probability value of each trading signals and technical analysis.

In an embodiment, the system 100 further includes an output generator module 160 comprising a processor 161 configured to receive and evaluate the individual resultant probability values of all generated trading signals and technical analysis to provide an output data. In one embodiment, the system 100 delivers the said output data via a notification to a user. In another embodiment, the output data is delivered to the user via a visual notification, an audio notification or a tactile notification.

In one embodiment, the output data includes a resultant trading signals and resultant technical analysis with the resultant probability value, a resultant market report, and a resultant risk and money management. In one embodiment, the output data of the said processors are uploaded to the adaptive database 102 of the neural network system 100. In another embodiment, the output data of the said processors is regulated real-time by the adaptive database 102 by comparing the success rating of each output data to one or more previous output data.

Figure 4A:
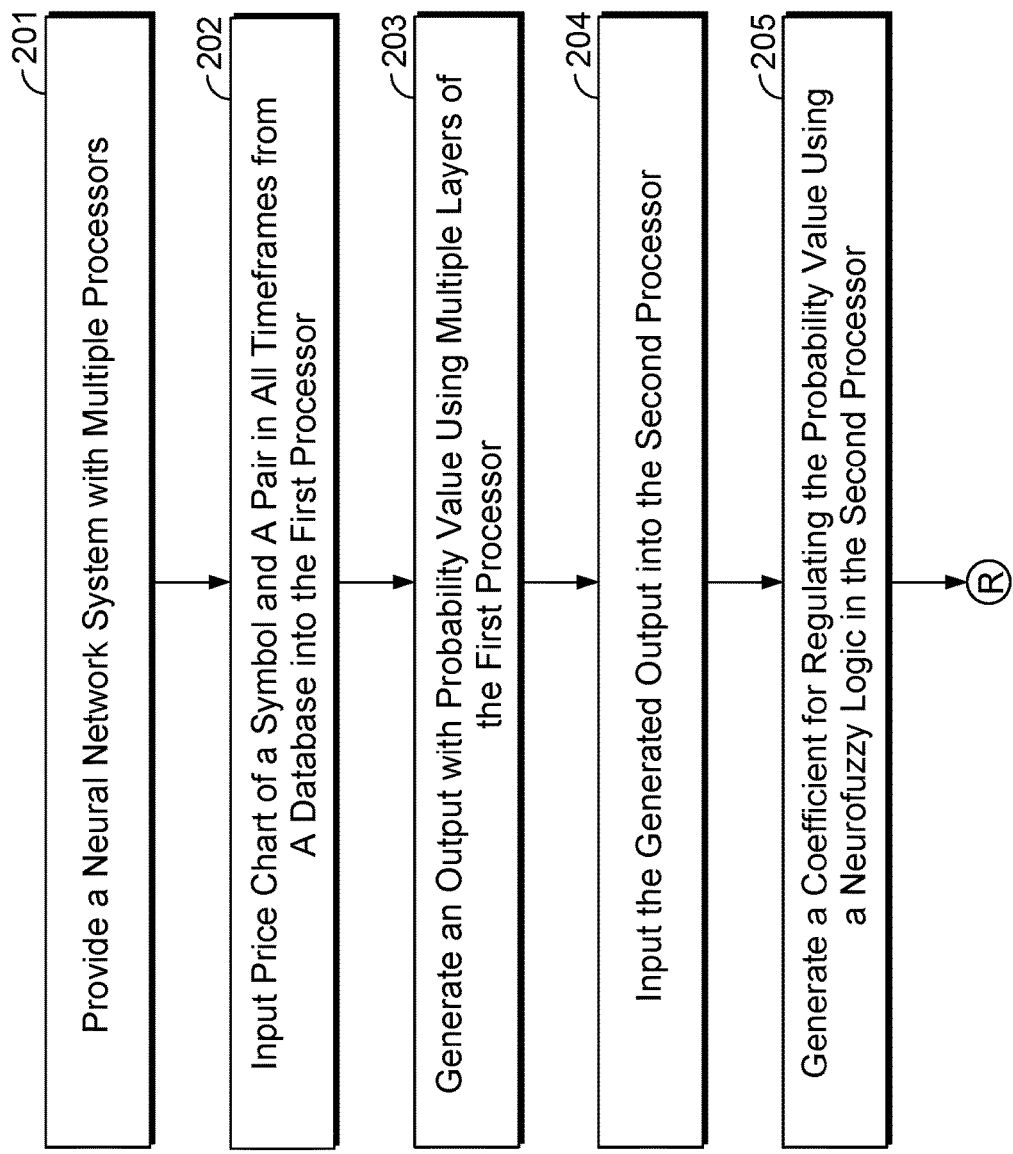
FIG. 4A-4B illustrates a flowchart of a method for intelligent market trading according to an embodiment.
Figure 4B:
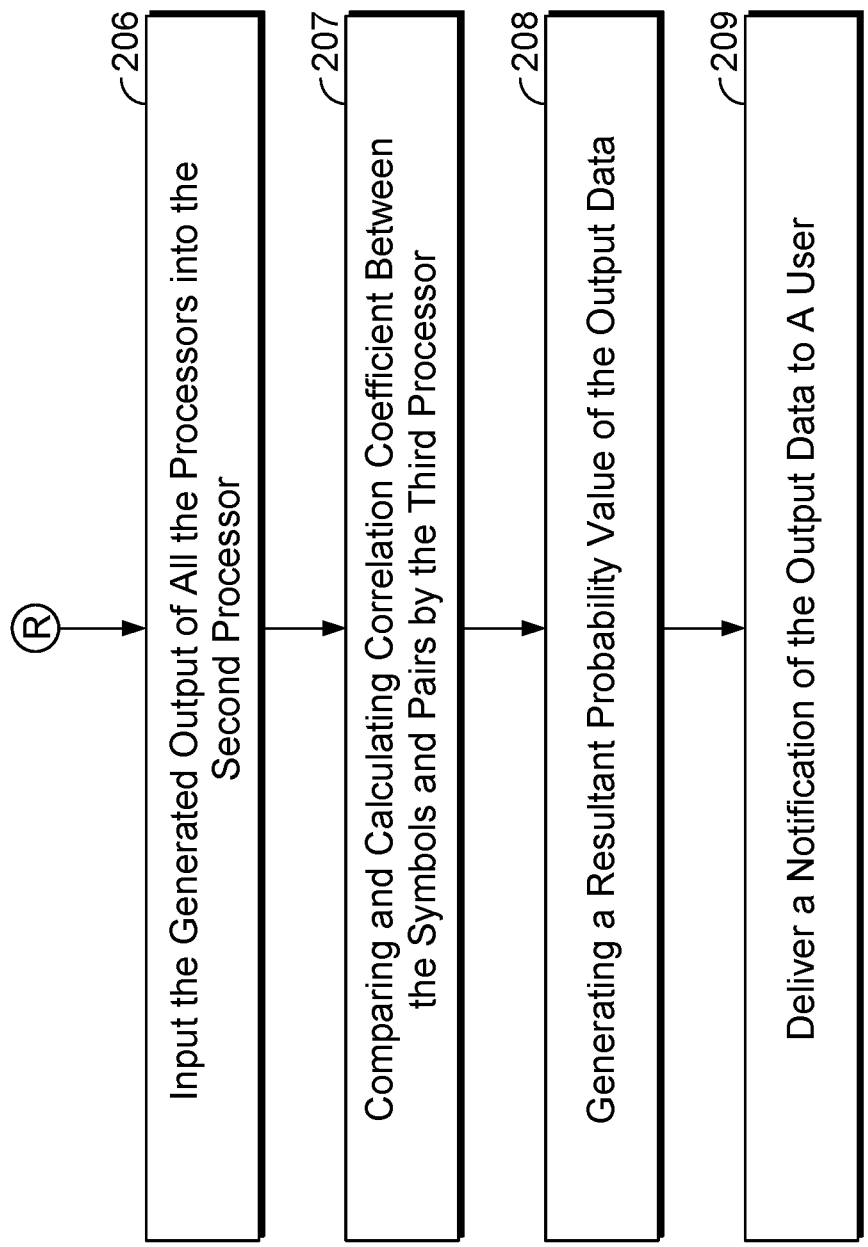

In an embodiment, a method 200 for intelligent market trading is shown in FIG. 4A-4B, implemented with a neural network system 100 as shown in FIG. 1A-1B. In one embodiment, the method 200 comprises a step of providing a neural network system 100 include one or more processors in step 201. In step 202 of the method 200, include inputting multiple financial market price chart of a symbol and a pair in all timeframes from a database 102 into the first processor. In step 203, the method 200 according to the invention generates a technical analysis, a trading signal, and a market report with a probability value by multiple layers of the first processor using one or more strategies. In step 204, the strategies are generated in a layer using a trading indicator and pattern with highest or predefined success rating in a dynamic structure inputted from the database 102.

One aspect of the present disclosure is directed to an intelligent market trading method implemented with a neural network, the computer-implemented system having processor-executable instructions stored thereon that, when executed by at least one processor, the method comprising: (a) providing a neural network system comprising a first processor, a second processor and a third processor; (b) inputting one or more financial market price chart of a symbol and a pair in all timeframes from a database into the first processor; (b) generating a technical analysis, a trading signal, and a market report with a probability value by one or more layers of the first processor, wherein generating a strategy in a layer using a trading indicator and pattern with predefined success rating in a dynamic structure inputted from the database; (c) inputting the generated technical analysis, trading signals, and market report into the second processor; (d) generating a coefficient for regulating the probability value of the generated trading signals and technical analysis by one or more layers of the second processor using a fuzzy logic; (e) inputting the generated trading signals and technical analysis of the symbols and pairs in all timeframes into the third processor; (f) comparing and calculating correlation coefficient between the said symbols and pairs by the third processor; (g) generating a resultant probability value of each trading signals and technical analysis as an output data; and (h) delivering the output data via a notification to a user.

In one embodiment, the generated output comprising technical analysis 151, trading signals 152, and market report 153 of the first processor are input into the second processor and generate a coefficient in step 205. In step 206, the generated coefficient is used for regulating the probability value of the generated trading signals and technical analysis by one or more layers of the second processor using fuzzy logic systems. In step 207, the generated trading signals and technical analysis of the symbols and pairs in all timeframes are inputted into the third processor. In step 208, the third processor is implemented with a mesh network to compare and calculate the correlation coefficient between the said symbols and pairs. In step 209, the final step of the method 200 generate a resultant probability value of each trading signals and technical analysis as an output data, and deliver a notification of the said output data to a user.

In an embodiment, a computer-readable storage medium having processor-executable instructions stored thereon that, when executed by one or more processors implemented with a neural network system 100 as shown in FIG. 1A-1B. In one embodiment, the said processors are configured to input financial market price chart of a symbol and a pair in all timeframes from a database 102 into the first processor. In one embodiment, the computer-readable storage medium generates a technical analysis 151, a trading signal 152, and a market report 153 with a probability value by one or more layers of the first processor using one or more strategies. In one embodiment, the strategies are generated in a layer using a trading indicator and pattern with highest or predefined success rating in a dynamic structure inputted from the database 102.

In an embodiment, the generated output comprising technical analysis 151, trading signals 152, and market report 153 of the first processor are input into the second processor and generate a coefficient. In one embodiment, the generated coefficient is used for regulating the probability value of the generated trading signals and technical analysis by one or more layers of the second processor using a fuzzy logic. In an embodiment, the generated trading signals and technical analysis of the symbols and pairs in all timeframes are inputted into the third processor. In one embodiment, the third processor is implemented with a mesh network to compare and calculate the correlation coefficient between the said symbols and pairs. In one embodiment, a computer-readable storage medium having processor-executable instructions stored thereon that, when executed by one or more processors cause the processors to generate a resultant probability value of each trading signals and technical analysis as an output data, and deliver a notification of the said output data to a user.

In an embodiment, the first processor is a chart processor 120, the second processor is a fundamental analysis and news processor 130, and the third processor is a correlation coefficient processor 140. In an embodiment, the generated coefficient is compared with the coefficient based on the one or more layers of the second processor using fuzzy logic systems to regulate the probability value of the trading signal and technical analysis. In one embodiment, the generated output of the said processors are uploaded to an adaptive database 102 of the neural network system 100. In another embodiment, the generated output of the said processors is regulated real-time by the adaptive database 102 and compare each output to one or more previous output in the adaptive database 102. In another embodiment, the fuzzy logic is a neuro-fuzzy logic of the neural network system 100.

In an embodiment, the output trading signals and technical analysis is configured with three states for adaptive database 102. In one embodiment, the three states for adaptive database are successful state, missed state, and invalid state. The missed state is defined as state of the price proceeds opposite to the predicted movement by the output and the price touches the stop loss of the trading signals or technical analysis. The invalid state is defined as state of the price did not met with take profit or stop loss prices within certain amount of time. In another embodiment, the three states is also implemented on all the output for trading signals and technical analysis. The system 100 enhances the weights and success rates of each and any effective factor that the whole system implement in different layers and sections. The proposed system combines the human brain function with computer performance that could learn by itself. The non-linear effects of fundamental analysis by news and economic conditions are implemented by the fuzzy logic systems in the neural network system 100.

The advantage of the proposed system and method is the implementation of multiple powerful patterns and indicators that is utilized under mesh topology producing dynamic strategies with highest or predefined success rate. Each pattern or indicator are provided with success rate or weightage, which are regulated by the latest success rate of the pattern or indicator on the specific symbol and timeframe. Further, the fundamental analysis is coupled automatically and utilized on the generated technical analysis and trading signal in real-time helps to notify accurate output to the user. The correlation coefficient of each symbol and pairs on the other symbols and pairs are used to develop a dynamic structure under mesh topology in the system.

The foregoing description comprise illustrative embodiments of the present invention. Having thus described exemplary embodiments of the present invention, it should be noted by those skilled in the art that the within disclosures are exemplary only, and that various other alternatives, adaptations, and modifications may be made within the scope of the present invention. Merely listing or numbering the steps of a method in a certain order does not constitute any limitation on the order of the steps of that method. Many modifications and other embodiments of the invention will come to mind to one skilled in the art to which this invention pertains having the benefit of the teachings presented in the foregoing descriptions. Although specific terms may be employed herein, they are used only in generic and descriptive sense and not for purposes of limitation. Accordingly, the present invention is not limited to the specific embodiments illustrated herein.

The invention claimed is:

1. A computer-implemented system for intelligent market trading implemented with a neural network, the computer-implemented system having processor-executable instructions stored thereon that, when executed by at least one processor, the computer-implemented system comprising:
   an input comprising a database of price of a symbol, and a pair in a timeframe, wherein the input is configured to provide a dynamic specification, and to provide a predetermined behavior of each symbol and pair in a plurality of individual timeframes;
   a chart processor implemented with the neural network, a chart processor comprising a plurality of layers, each layer is configured to receive the respective input to generate a technical analysis, a trading signal, and a market report, the chart processor comprising:
      a strategy generator processor configured to receive the input to generate multiple strategies using a trading indicator with a predefined success rating in a dynamic structure inputted from the database, wherein the strategy generator processor connects the trading indicator in a plurality combinations of the symbol and the pair to generate one or more strategies using a mesh network;
      a technical analysis and trading signal processor comprising the layers, each layer configured to receive one or more generated strategies, wherein the technical analysis and trading signal processor comprises:

a strategy layer configured to receive one or more generated strategies, wherein each strategy is regulated with the predefined success rating inputted from the database;

a timeframe layer configured to receive one or more regulated strategies from the strategy layer, and is configured to calculate and control the correlation between different timeframes of each symbol generating a probability value of the trading signal, wherein the timeframes on each symbol is regulated with the predefined success rating inputted from the database;

a symbol layer configured to receive one or more generated probability values of the trading signal from the timeframe layer, and is configured to calculate an effect of the generated technical signal on different symbols and pairs in a specific timeframe, wherein the trading signal on the symbols and pairs in the specific timeframe is regulated with the predefined success rating inputted from the database;

an output layer configured to receive the input from the layers to generate the trading signals, technical analysis and market report with the generated probability value of the symbol and the pair in the specific timeframe;

a fundamental processor is configured to receive the generated trading signals and the technical analysis from the output layer of the chart processor, wherein the generated trading signals and the technical analysis are coupled to a fundamental analysis layer and a news layer using fuzzy logic to generate a coefficient for regulating the probability value of the generated trading signals and the technical analysis;

a correlation coefficient processor coupled with the mesh network to receive all the trading signals and the technical analysis of the symbols and the pairs in the timeframes, the correlation coefficient processor is configured to calculate the correlation coefficient between the symbols and the pairs generating a resultant probability value of each trading signal and the technical analysis; and an output generator module comprising a output processor configured to receive and evaluate the individual resultant probability value of the generated trading signals and the technical analysis to provide one or more output data, wherein the computer-implemented system delivers the output data via a notification to a user.

2. The computer-implemented system of claim 1, wherein each trading pattern is a node for the mesh network.

3. The computer-implemented system of claim 1, wherein the market report is generated by using a report builder in the output layer of the chart processor.

4. The computer-implemented system of claim 1, wherein the news layer receives one or more news from the database as an input using the fuzzy logic systems.

5. The computer-implemented system of claim 1, wherein the fundamental analysis layer receives an analysis from one or more financial market analyzers from the database as an input using the fuzzy logic systems.

6. The computer-implemented system of claim 1, wherein the output data of the processors are uploaded to an adaptive database of the neural network.

7. The computer-implemented system of claim 6, wherein the output data of the processors are regulated real-time by the adaptive database, wherein comparing the success rating of each output to one or more previous output in the adaptive database.

8. The computer-implemented system of claim 1, wherein the output data includes a resultant trading signals and resultant technical analysis with the resultant probability value, a resultant market report, and a resultant risk and money management.

9. The computer-implemented system of claim 1, wherein the output data is delivered to the user via a visual notification, an audio notification or a tactile notification.

10. A computer-readable storage medium having processor-executable instructions stored thereon that, when executed by one or more processors cause the processors to:

input one or more financial market price chart of a symbol and a pair in all timeframes from a database into said first processor;

generate a technical analysis, a trading signal, and a market report with a probability value by one or more layers of the first processor, wherein generating a strategy in a layer using a trading indicator and pattern with predefined success rating in a dynamic structure inputted from the database;

input the generated technical analysis, trading signals, and market report into a second processor;

generate a coefficient for regulating the probability value of the generated trading signals and technical analysis by one or more layers of the second processor using a fuzzy logic;

input the generated trading signals and technical analysis of the symbols and pairs in all said timeframes into said third processor;

compare and calculating a correlation coefficient between the symbols and pairs by the third processor;

generate a resultant probability value of each trading signals and technical analysis as an output data; and deliver the output data via a notification to a user.

11. The computer-readable storage medium of claim 10, wherein the generated coefficient is compared with the coefficient based on the one or more layers of the second processor using fuzzy logic systems to regulate the probability value of the trading signal and technical analysis.

12. The computer-readable storage medium of claim 10, wherein the generated output of the said processors are uploaded to an adaptive database of the neural network.

13. The computer-readable storage medium of claim 12, wherein the generated output of the said processors is regulated real-time by the adaptive database, wherein comparing each output to one or more previous outputs in the adaptive database.

14. An intelligent market trading method implemented with a neural network, system having processor-executable instructions stored thereon that, when executed by at least one processor, the method comprising:

providing said neural network system comprising a first processor, a second processor and a third processor;

inputting one or more financial market price chart of a symbol and a pair in all timeframes from a database into the first processor;

generating a technical analysis, a trading signal, and a market report with a probability value by one or more layers of the first processor, wherein generating a strategy in a layer using a trading indicator and pattern with predefined success rating in a dynamic structure inputted from the database;

inputting the generated technical analysis, trading signals, and market report into the second processor;

generating a coefficient for regulating the probability value of the generated trading signals and technical analysis by one or more layers of the second processor using fuzzy logic systems;

inputting the generated trading signals and technical analysis of the symbols and pairs in all said timeframes into the third processor;

comparing and calculating correlation coefficient between the said symbols and pairs by the third processor;

generating a resultant probability value of each trading signals and technical analysis as an output data; and delivering the output data via a notification to a user.

15. The method of claim 14, wherein the first processor is a chart processor.

16. The method of claim 14, wherein the second processor is a fundamental analysis and news processor.

17. The method of claim 14, wherein the third processor is a correlation coefficient processor.

18. The method of claim 14, wherein the generated coefficient is compared with the coefficient based on the one or more layers of the second processor using fuzzy logic systems to regulate the probability value of the trading signal and technical analysis.

19. The method of claim 14, wherein the output data of the processors are uploaded to an adaptive database of the neural network system.

20. The method of claim 14, wherein the output data of the processors are regulated real-time by the adaptive database, wherein comparing each output to one or more previous outputs in the adaptive database.

* * * * *